Nov. 12, 1929.  A. D. GALLAGHER  1,735,568
LISTER CULTIVATOR
Filed April 2, 1923  3 Sheets-Sheet 2
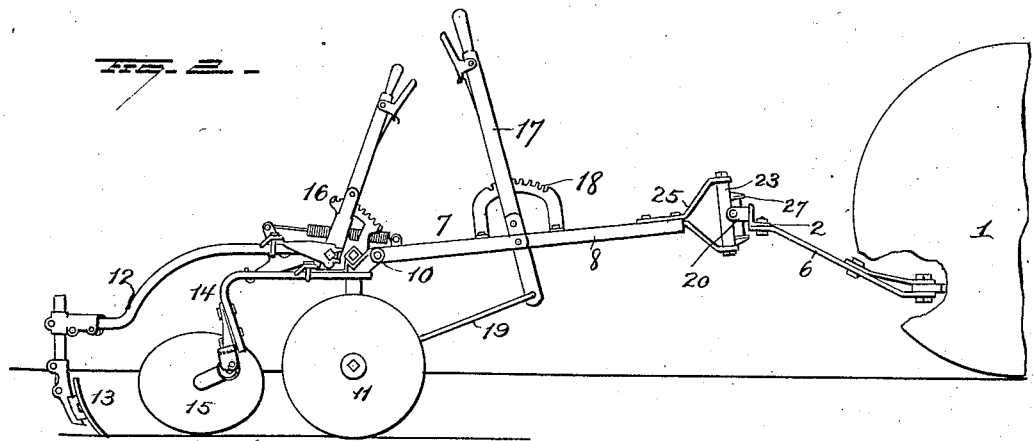
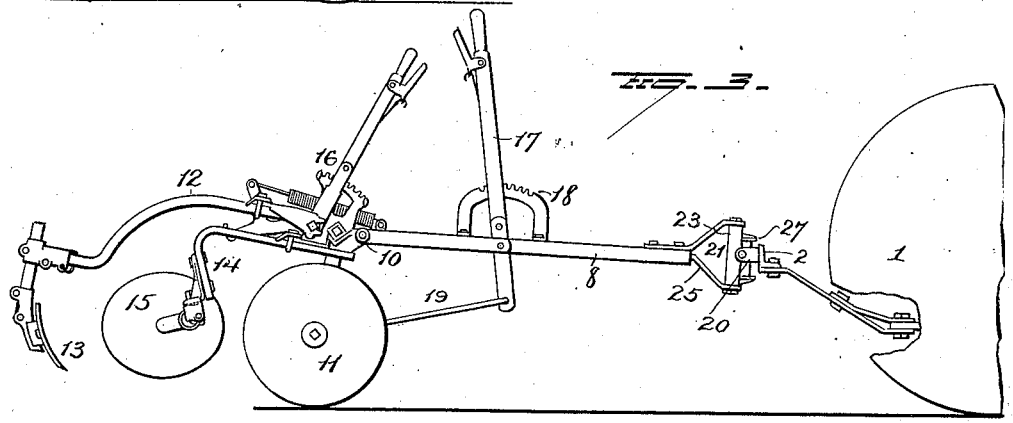
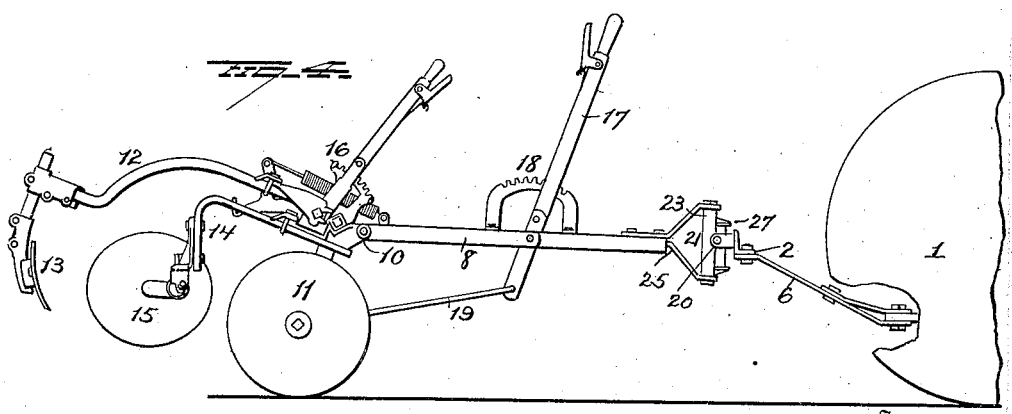

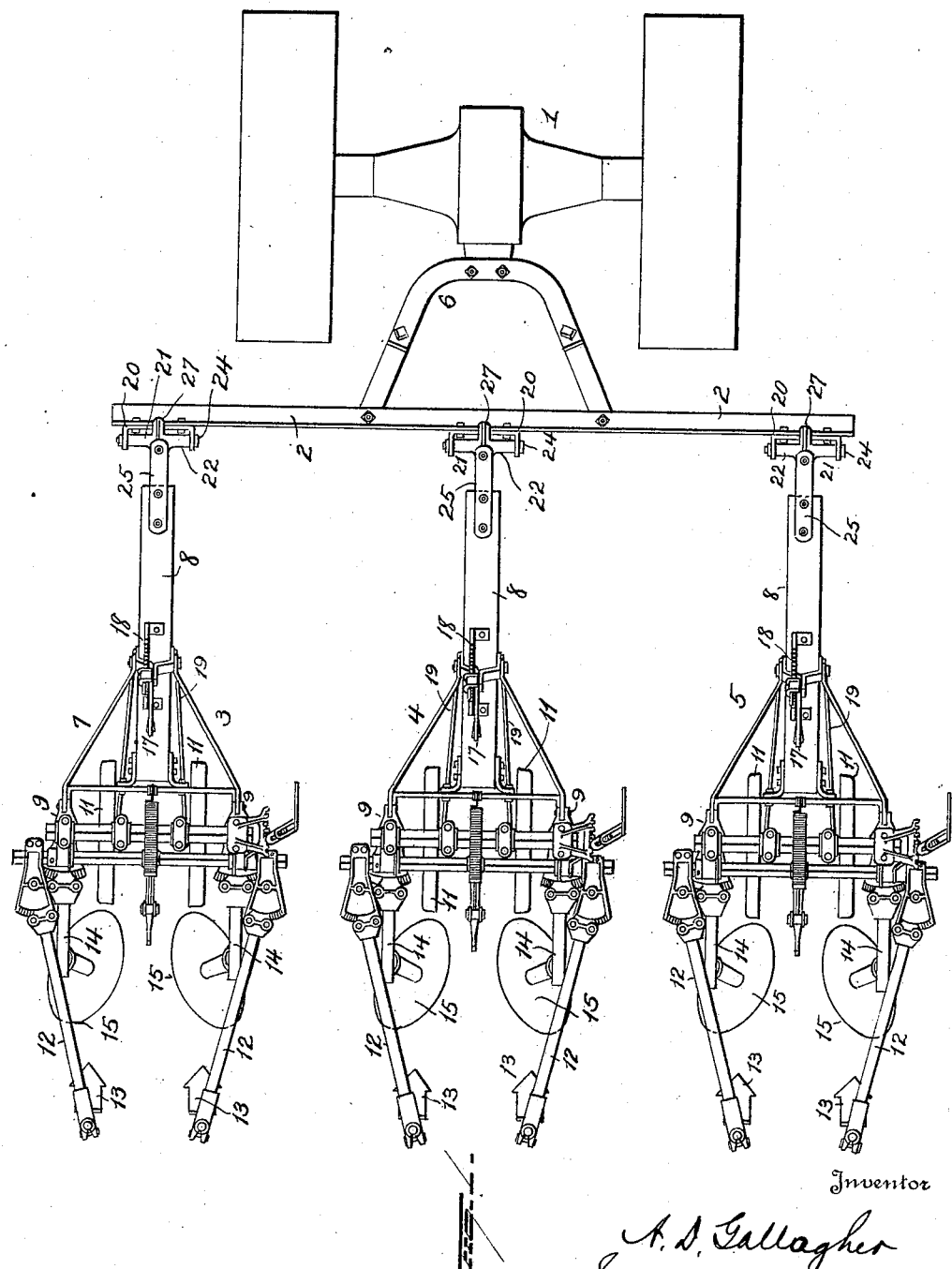

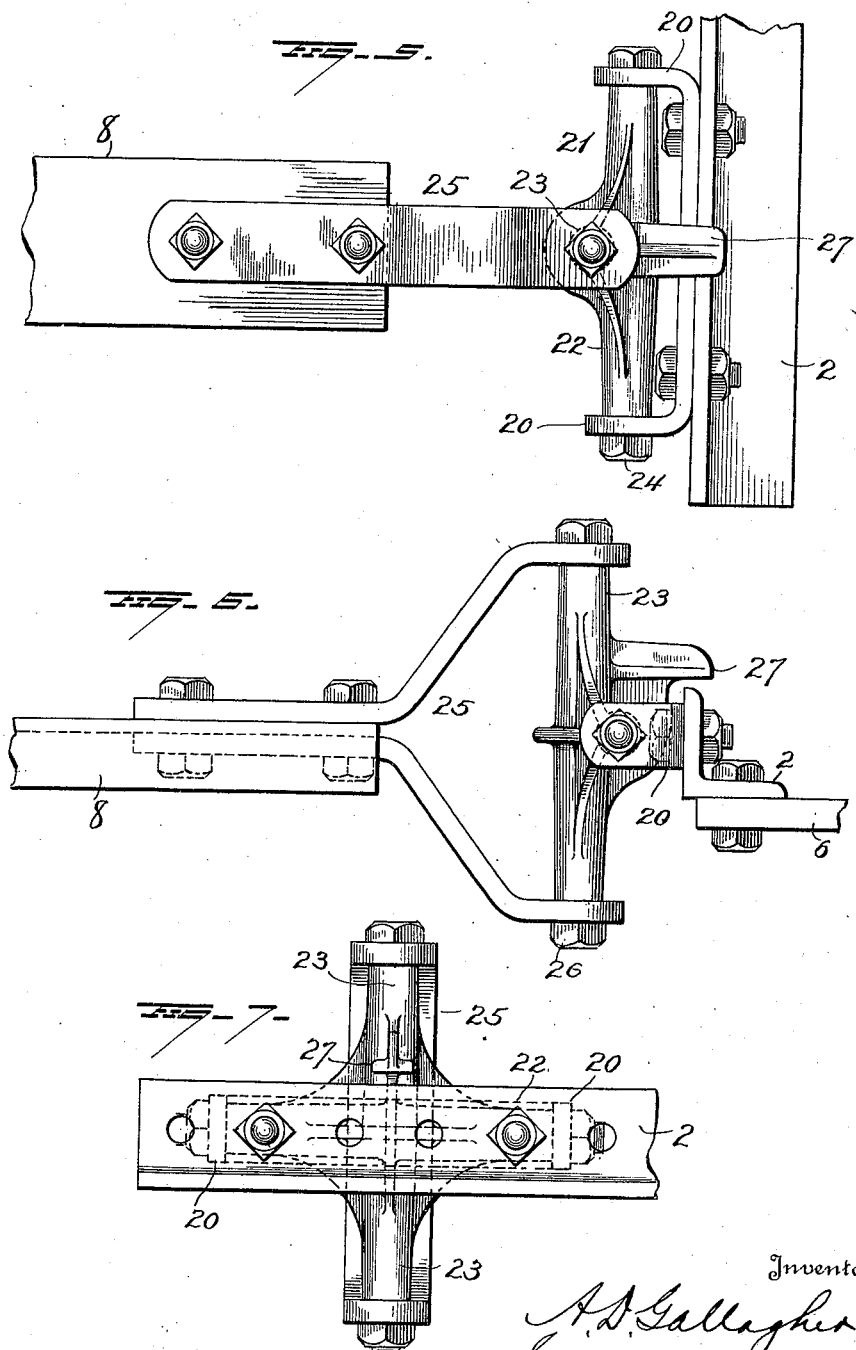

Patented Nov. 12, 1929

1,735,568

UNITED STATES PATENT OFFICE

ARTHUR D. GALLAGHER, OF SOUTH BEND, INDIANA, ASSIGNOR, BY MESNE ASSIGNMENTS, TO OLIVER FARM EQUIPMENT COMPANY, A CORPORATION OF DELAWARE

LISTER CULTIVATOR

Application filed April 2, 1923. Serial No. 629,441.

This invention relates to improvements in lister cultivators and more particularly to those of the multi-unit type,—my present improvements having special reference to means whereby the cultivator units are connected with a tractor.

One object of the invention is to so construct the draft connections between the tractor and the cultivator or gang units of a multi-unit lister cultivator, that said units shall be disposed side by side and maintained substantially parallel so that they will not interfere with each other during turning movements of the cultivator.

A further object is to provide simple and efficient means for coupling the cultivator units to a common transversely disposed draft beam rigidly secured to a tractor, whereby the gang units may pivot both vertically and laterally, and at the same time be held rigidly against turning on axes coincident with the longitudinal axes of the cultivator gang units, thus maintaining said units parallel, transversely, with the transversely disposed draft bar or beam which is rigidly secured to the tractor.

A further object is to so couple the cultivator units of a multi-unit cultivator having carrying wheels, that the earth-working elements will be raised automatically when the ground or carrying wheels run out of the ends of furrows.

With these and other objects in view, the invention consists in certain novel features of construction and combinations of parts as hereinafter set forth and pointed out in the claim.

In the accompanying drawings,—

Figure 1 is a plan view of a multi-unit cultivator connected with a tractor and showing an embodiment of my invention.

Figure 2 is a side elevation with the parts in normal working positions.

Figure 3 is a side elevation showing the positions of the parts, with the earth-working elements raised, after the ground wheels shall have run out of the end of a furrow.

Figure 4 is a view in side elevation showing the earth-working elements raised to maximum height to facilitate the transporting of the cultivator, and Figures 5, 6 and 7 are enlarged detail views showing the coupling devices.

In the drawings, a tractor is represented at 1 and at 2 a transversely disposed draft beam for connection of the several cultivator units 3, 4, 5, is shown. The draft beam 2 is rigidly connected with the tractor through the medium of a rigid yoke or frame 6 bolted intermediate of its ends to a part of the tractor and at its rear flaring ends to the intermediate part of the draft beam 2.

Each cultivator unit comprises a forward frame 7 including a forwardly projecting tongue or beam 8, and a rear frame 9 pivotally connected at 10 with the rear portion of the forward frame and supported on carrying or ground wheels 11,—said rear frame having arms or bars 12 adjustably attached thereto and projecting rearwardly for carrying shovels 13 and said rear frame is also provided with adjustable arms or bars 14 which carry cultivator disks 15. Suitable hand operated devices shown at 16 are provided for raising, lowering and adjusting the cultivator shovels and a lever 17 pivotally supported between its ends by the forward frame 7 and provided with a detent for cooperation with a toothed segment 18, has its lower end connected through the medium of rods 19 with the axle of the carrying wheels and thus in effect with the rear portion of the pivoted rear frame. It is apparent that by operating the lever 17, the rear frame may be raised or lowered and when raised the earth-working elements will be elevated, as shown in Fig. 4.

The transversely disposed draft beam 2 is preferably made in the form of angle-iron and to its rear upwardly projecting member, a plurality of approximately U-shaped brackets 20 are securely bolted. Between the rearwardly projecting end members of each bracket 20, a coupling member 21 is loosely mounted. Each coupling member comprises a horizontal sleeve or tubular arm 22 and a vertical sleeve or tubular arm 23 integral therewith. A rod or bolt 24 passes through the tubular member 22 to pivotally connect the same with the bracket 20. The vertical sleeve or member 23 is disposed between the arms of a bracket 25 secured to the forward end of beam 8 and is pivotally connected with said bracket 25 by means of a bolt or rod 26 passing through said member 23 and the arms of said bracket.

With the construction and arrangement of coupling above described, vertical movement of the cultivator unit will be permitted but upward vertical movement may be limited by means of a stop-arm 27 projecting forwardly from the central portion of the coupling member 21 and adapted to engage the transverse draft beam 2. The cultivator unit will thus be prevented from jumping from the furrow when passing over obstructions. It is also apparent that with my improvements, horizontal movement of the cultivator units will be permitted through the medium of the pivotal connection of the forward end of each unit with the vertical sleeve 23 of the coupling member.

While the vertical and horizontal movements of the cultivator units will be permitted, said units will be prevented by reason of my improvements from capsizing by turning on axes coincident with the longitudinal axes of the cultivator gang units.

By connecting the several cultivator or gang units in the manner above described with a transversely disposed draft beam rigidly connected with the tractor, the several units will be kept substantially parallel with each other and conflict of one unit with another during turning movements of the cultivator will be avoided.

When the cultivator units run out of the ends of furrows their carrying wheels will run up the hills formed by the furrow ends and the units will be raised, turning on the horizontal pivots between the forward ends of said units and the draft beam 2 and the earth-working elements will thus be caused to be elevated as represented in Fig. 3. Further elevation of the earth-working elements, to facilitate transporting of the cultivator, may be effected by the raising and lowering devices indicated at 17 and said earth-working elements will then assume the position indicated in Fig. 4. If the ground wheels should pass over a rise in the furrow or an obstruction of such height that the stop arm 27 is rocked down to the draft beam, the arm will help to sustain the weight of the elevated elements, thereby relieving the strain upon the pivotal connections.

Having fully described my invention what I claim as new and desire to secure by Letters Patent, is:

In a cultivator, the combination with a transverse draft beam to be disposed in rear of a tractor, means for rigidly securing the said draft beam to a tractor, and a plurality of cultivators, of a coupling device for each cultivator, each coupling device comprising two members disposed at right angles to each other, one of said members connected with the draft beam by a horizontal pivot and the other member connected with one of the cultivators by a vertical pivot, and a stop arm projecting forwardly from each coupling device over the plane of the draft beam and cooperable with the same to limit the vertical movements of the cultivator.

In testimony whereof, I have signed this specification.

ARTHUR D. GALLAGHER.